United States Patent
Rekaya Ben-Othman et al.

(10) Patent No.: US 12,155,424 B2
(45) Date of Patent: Nov. 26, 2024

(54) SYSTEM AND METHOD FOR UPLINK COORDINATED TRANSMISSION IN AN OPEN RADIO ACCESS NETWORK

(71) Applicant: INSTITUT MINES TELECOM, Palaiseau (FR)

(72) Inventors: Ghaya Rekaya Ben-Othman, Antony (FR); Chao Zhang, Orsay (FR); Aymen Askri, Palaiseau (FR)

(73) Assignee: INSTITUT MINES TELECOM, Palaiseau (FR)

( * ) Notice: Subject to any disclaimer, the term of this patent is extended or adjusted under 35 U.S.C. 154(b) by 0 days.

(21) Appl. No.: 18/274,233

(22) PCT Filed: Feb. 3, 2022

(86) PCT No.: PCT/EP2022/052552
§ 371 (c)(1),
(2) Date: Jul. 26, 2023

(87) PCT Pub. No.: WO2022/175098
PCT Pub. Date: Aug. 25, 2022

(65) Prior Publication Data
US 2024/0106498 A1    Mar. 28, 2024

(30) Foreign Application Priority Data
Feb. 19, 2021   (EP) .................................... 21305208

(51) Int. Cl.
*H04B 7/024* (2017.01)
*H04B 7/0456* (2017.01)
(52) U.S. Cl.
CPC ........... *H04B 7/024* (2013.01); *H04B 7/0456* (2013.01)

(58) Field of Classification Search
CPC ...... H04B 7/024; H04B 7/0456; H04B 7/026; H04B 7/022; H04W 28/06; H04W 88/085
See application file for complete search history.

(56) References Cited

U.S. PATENT DOCUMENTS 11,612,016 B2 * 3/2023 Raghothaman ......... H04W 8/20
11,997,510 B2 * 5/2024 Sekar .................... H04W 24/02
(Continued)

FOREIGN PATENT DOCUMENTS

WO    2016/007757 A1    1/2016

OTHER PUBLICATIONS

Chai, et al., "SPIRO: Turning elephants into mice with efficient RF transport", 2015 IEEE Conference on Computer Communications (INFOCOM), pp. 819-827, 2015.
(Continued)

*Primary Examiner* — Khanh C Tran
(74) *Attorney, Agent, or Firm* — Baker Hostetler

(57) ABSTRACT

A communication system having to an open radio access network architecture, the communication system includes a number (K) of user equipments configured to exchange messages through the communication system, the communication system comprising one or more radio unit and a distributed unit, each radio unit being connected to the distributed unit through a fronthaul link having a given capacity. The communication system comprises a coordination system being configured to coordinate the exchanges between the radio units of the system and the distributed unit, in response to a signal received by the radio units from a user equipment. The coordination system is configured to send a signalling message to each radio unit comprising data stream selection information, each radio unit comprising: a transformation unit configured to apply a transformation operation to the signal vector received by the radio unit,
(Continued)

which provides a transformed vector, the transformation operation being defined to reduce the dimension of the received signal vector; a data stream selection unit configured to select a number of data streams corresponding to components of the transformed vector using the data stream selection information comprised in the signalling message, a quantizer configured to apply a quantization operation to the selected data streams, which provides quantized vectors, the radio unit being configured to send the quantized vectors to the distributed unit. The sum of the numbers of data streams selected at the radio units, over all the radio units of the communication system, is higher or equal to the product of the number of user equipments (K) and the number of antennas of a user equipment.

15 Claims, 6 Drawing Sheets

(56) References Cited

U.S. PATENT DOCUMENTS

| | | | |
|---|---|---|---|
| 12,082,003 B2* | 9/2024 | Dussmann | H04W 28/0231 |
| 2022/0116087 A1* | 4/2022 | Österling | H04B 7/0617 |
| 2023/0119776 A1* | 4/2023 | Ma | H04L 5/0051 370/329 |

OTHER PUBLICATIONS

Slepian, et al., "Noiseless coding of correlated information sources", IEEE Trans. Inf. Theory, vol. 19, pp. 471-480, Jul. 1973.
Wyner, et al. "The rate-distortion function for source coding with side information at the decoder", IEEE Trans. Inf. Theory, vol. 22, pp. 1-10, Jan. 1976.

* cited by examiner

SYSTEM AND METHOD FOR UPLINK COORDINATED TRANSMISSION IN AN OPEN RADIO ACCESS NETWORK

CROSS-REFERENCE TO RELATED APPLICATIONS

This application is a National Stage of International patent application PCT/EP2022/052552, filed on Feb. 3, 2022, which claims priority to foreign European patent application No. EP 21305208.7, filed on Feb. 19, 2021, the disclosures of which are incorporated by reference in their entireties.

TECHNICAL FIELD

The invention generally relates to communication system and in particular to a communication system implemented according to an open Radio Access Network (O-RAN) and a coordination method implemented in such communication system.

BACKGROUND

With the extensive use of advanced wireless devices and video streaming, smaller size cellular networks have emerged to meet exponentially increasing data rates demands. As a result, the distance between base stations has become smaller, which in turn has resulted in larger inter-cell interference.

Cellular radio access networks (RANs) have traditionally used proprietary network equipment from a small group of network equipment manufacturers. In recent years, an open RAN (also known as O-RAN) architecture has been adopted for 5G standards.

The O-RAN architecture introduces three distinct components
   a radio unit O-RU (Radio Head),
   a distributed unit O-DU (Central Processor), and
   a centralized unit (O-CU).

The Open Radio Access Network (O-RAN) has been developed to cope with the dominant inter-cell interference and to boost the network performance, by enabling the joint encoding (downlink DL) and decoding (uplink UL) at the O-DU. In an uplink scenario (UL), to forward the received signal at O-RU, each O-RU needs to firstly compress/quantize the signal and then transmit it to the O-DU via the fronthaul link in a distributed way.

Two coding schemes have been proposed:
In D. S. Slepian and J. K. Wolf, "Noiseless coding of correlated information sources", IEEE Trans. Inf. Theory, vol. 19, pp. 471-480, July 1973, coding was proved to be optimal as the information theoretical lossless compression on distributed compression.
In A. D. Wyner and J. Ziv, "The rate-distortion function for source coding with side information at the decoder," IEEE Trans. Inf. Theory, vol. 22, pp. 1-10, January 1976, a coding approach was proposed to deal with the lossy distributed compression problems.

These two coding schemes are based on shifting the computational complexity from encoder to decoder, which is adapted to a O-RAN system (cloud RAN) since the computational load is shifted from O-RUs to the O-DU while in O-RAN most of the computations should be at the O-DU.

However, the implementation of the two schemes proposed by these techniques can be prohibitive or even impossible. Indeed, both schemes are based on the rate-distortion theory which assumes the infinite blocklength for the source coding, while this assumption cannot be validated in the real system. Further, the computational complexity to obtain these two schemes are prohibitive as it requires solving non convex optimization problems, especially in the case where the O-RUs are equipped with large amount of antennas.

There is accordingly a need to provide an improved communication system and method in an open radio access network, enabling sending the useful information as much as possible from the radio units to the distributed unit while enhancing the joint decoding performance at the Distributed unit.

SUMMARY OF THE INVENTION

To address these and other problems, there is provided a communication system having to an open radio access network architecture, said communication system comprising a number of user equipments configured to exchange messages through the communication system, each user equipment comprising a number of antennas, the communication system comprising one or more radio unit and a distributed unit. Each radio unit is connected to the distributed unit through a fronthaul link having a given capacity. The communication system comprises a coordination system configured to coordinate the exchanges between the radio units of the system and the distributed unit, in response to a message being received by the radio units from a user equipment, the message received at each radio unit being represented by a signal vector. The coordination system is configured to send a signalling message to each radio unit comprising data stream selection information. Each radio unit comprises:
   a transformation unit configured to apply a transformation operation to the signal vector received by the radio unit, which provides a transformed vector, said transformation operation being defined to reduce the dimension of the received signal vector;
   a data stream selection unit configured to select a number of data streams corresponding to components of the transformed vector using the data stream selection information comprised in the signalling message,
   a quantizer configured to apply a quantization operation to the selected data streams, which provides quantized vectors,
   the radio unit being configured to send the quantized vectors to the distributed unit, wherein the sum of the numbers of data streams selected at each radio unit over all the radio units of the communication system is higher or equal to the product of the number of user equipments and the number of antennas of a user equipment.

In one embodiment, the distributed unit comprises a reconstruction unit configured to perform a reconstruction of the received signal vector based on the quantized vectors received from all the radio units, which provides a reconstructed signal vector, and a decoder configured to decode the reconstructed signal vector to determine an estimate of the signal transmitted by the user equipment.

In some embodiments, the data stream selection information received through a signalling message by a given radio unit may comprise a selection vector, associated with said radio unit, the selection vector having a length corresponding to the number of receiving antennas at the radio units. The data stream selection unit of the given radio unit may be configured to extract the selection vector corresponding to the given radio unit from the signalling message, and perform the matrix multiplication between the extracted selection vector $V_n$ and the transformed vector, which provides a vector of selected data streams, the quantizer of the given radio-unit being applied to vector of selected data streams.

The selection vector associated with each radio unit may be determined from the Channel State Information.

In one embodiment, the i-th coefficient of the selection vector associated with the given radio unit may have a value equal to 1 if the i-th component of the transformed vector has to be sent from the given radio unit to the distributed unit, and otherwise may have a value equal to 0 if the i-th component of the transformed vector is not to be sent from the given radio unit to the distributed unit.

Each selection vector may be determined based on the eigenvalues of a covariance channel matrix.

The set of selection vectors $(V_1, \ldots V_n, \ldots V_N)$ associated with all the radio units may be determined such that $$\Sigma_{n=1}^{N} V_n(i) \geq 1,$$

with N designating the number of radio units, and $V_n(i)$ designates the i-th element of the vector $V_n$.

In one embodiment, the selection vectors may be determined by the distributed unit.

The selection vectors associated with the radio units may only depend on statistical information of the channel matrix.

In particular, if the $k^{th}$ and $m^{th}$ entries of the covariance matrix of the transformed vector have the strongest average power over all channel realizations, each selection vector $(V_j)$ may be defined such that the component $V_j(k)$ of the selection vector is equal to the value one and the component $V_j(m)$ of the selection vector is equal to the value one.

Alternatively, the selection vectors associated with the radio units may only depend on instantaneous realizations of the channel matrix.

In particular, the selection vectors associated with the radio units may be determined based on a Received Signal-to-noise Ratio priority. In such embodiment, the coordination system may be configured to send auxiliary signalling messages between the radio units to exchange priority indexes.

In some embodiments, the selection vectors associated with the radio units may be determined based on a condition number of channel matrix priority (CNP).

In one embodiment, the coordination system may be distributed, the signalling message being exchanged between the radio units.

There is further provided a coordination method implemented in a communication system having an open radio access network architecture, the communication system comprising a number of user equipments exchanging messages through the communication system, the communication system comprising one or more radio unit and a distributed unit each radio unit being connected to the distributed unit through a fronthaul link having a given capacity. The coordination method comprises coordinating the exchanges between the radio units of the system and the distributed unit, in response to the receipt of a message by the radio units (5) transmitted from a user equipment, the message received at each radio unit being represented by a signal vector. The method comprises sending a signalling message to each radio unit comprising data stream selection information. The method further comprises, at each radio unit:

applying a transformation operation to the signal vector received by the radio unit, which provides a transformed vector, the transformation operation being defined to reduce the dimension of the received signal vector;

selecting a number of data streams corresponding to components of the transformed vector using the data stream selection information comprised in the signalling message, applying a quantization operation to the selected data streams, which provides quantized vectors, the method comprising sending the quantized vectors from the radio unit to the distributed unit, wherein the sum of the numbers of data streams selected at each O-RU over all the radio units of the communication system (100) is higher or equal to the number of user equipments (K) and the number of antennas of a user equipment.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Figure 1:
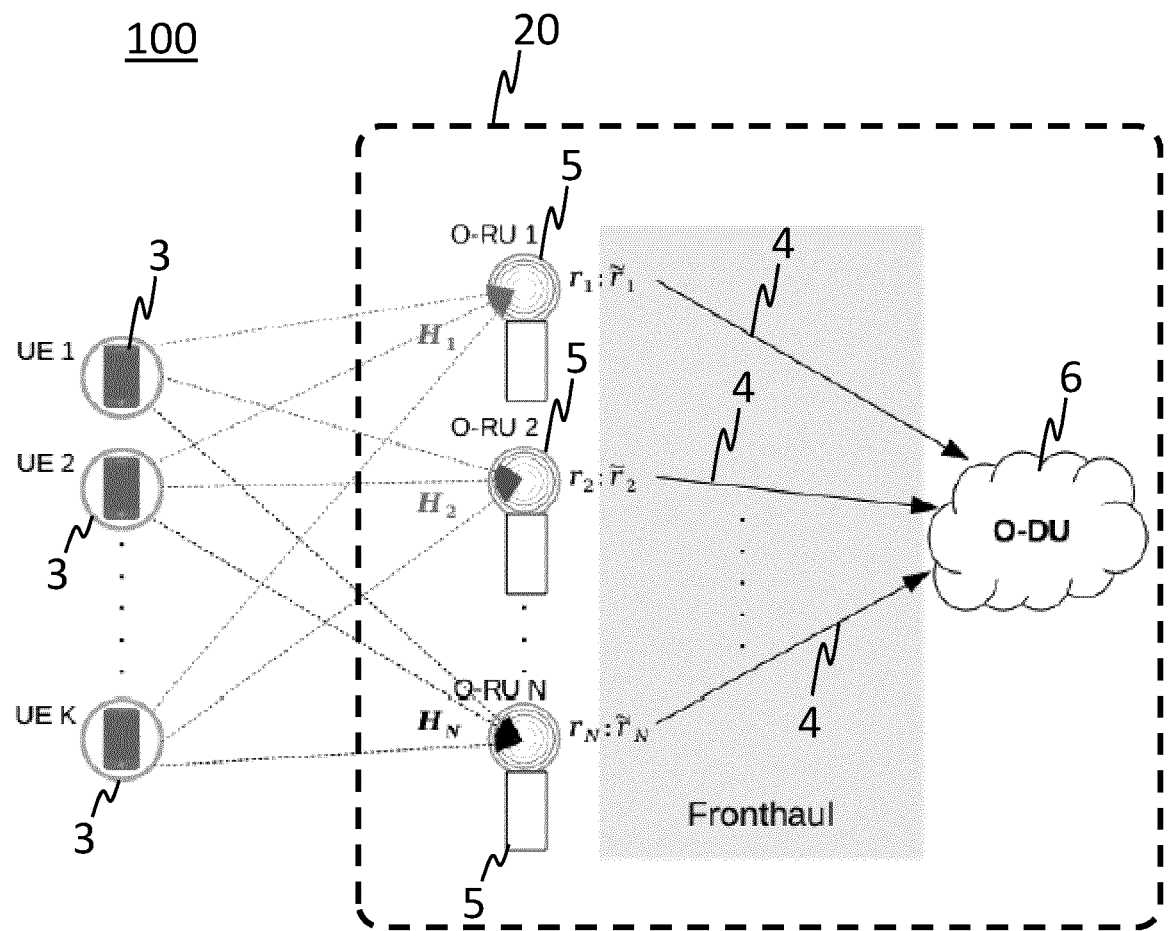
FIG. 1 depicts a communication system using a O-RAN architecture, in accordance with some embodiments of the invention.

FIG. 1 represents a wireless communication system 100 implemented according to a O-RAN architecture.

The O-RAN is configured to provide network services to one or more User Equipment (UE) 3 via wireless radio signals.

Each user equipment 3 may be a stationary or fixed wireless portable device configured to communicate using wireless connections, such as a cellular phone, a handheld device, a tablet, a laptop computer, or a smart phone, etc.

The O-RAN architecture comprises one or more multiple radio unit O-RAN Radio Unit O-RUs 5 (also referred to as Radio Head), a O-RAN Distributed Unit O-DU 6 (also called "Central Processor" or CP) and a O-RAN centralized unit O-CU 7.

An O-RU 5 may provide wireless service to one or more User Equipments 3.

An O-RU 5 may comprise one or more antennas. Each User Equipment 3 may have at least one antenna.

In the considered uplink cloud RAN model, it is considered that K remote users with $N_t$ transmit antennas send their messages, using their respective user equipments 3, independently to N remote O-RUs 5, each O-RU 5 being equipped with $N_r$ ($N_r \gg N_t$) antennas.

Each O-RAN Radio Unit (O-RU) 5 is connected to the O-RAN Distributed Unit (O-DU) 6 through a O-RAN Fronthaul link (FH) 4. The Fronthaul link 4 is a noiseless fronthaul link which is assumed to have a limited capacity $C_i$ so that the received signals at the O-RUs 5 need to be compressed in a distributed way to fulfill the capacity constraints before forwarded to the O-DU 6.

The communication system 100 comprises a coordination system 20 to coordinate the exchanges between the O-RUs 5 and the O-DU. The coordination system 20 implement a coordinated compression scheme among O-RUs 6 that enhance the decoding performance at O-DU 6, by further reducing the dimension of data streams sent from the O-RUs to the O-DU 6.

The communication system 100 may be used in many applications, such as for example in MU-MIMO communication, wireless sensor networks, or NR 5G systems.

In one embodiment, the communication network 100 may implement a MIMO based technique (such as MIMO or MU-MIMO) for transmission of data packets (also called data 'frames') in the O-RAN network.

The coordination system 20 is configured to perform a compression of the signals received by the O-RUs 5 in a coordinated way by use of a signalling message.

The i-th fronthaul link 4 between the i-th O-RU and the O-DU is considered to have an individual and same capacity constraint $C_i$ inferior or equal to a capacity threshold C ($C_i \leq C$). A message transmitted by a user i, equipped with a user equipment 3, is denoted as $x_i$ and belongs to a finite constellation $\mathbb{T}$.

A signal $x_i$ emitted by a user equipment i is received by each radio units O-RU j (5).

The signal $y_j$ received by a O-RU j (5) can be expressed as:

$$y_j = \Sigma_{i=1}^{K} H_{ji} x_i + z_j \quad (1)$$

In equation (1), $H_{ji} \in \mathbb{C}^{N_r \times N_t}$ denotes the channel matrix between O-RU j and user i, and $z_j \sim \mathcal{CN}(0, \sigma^2 I_{N_r})$ denotes the received noise at O-RU j.

Equation (1) can be also written:

$$y_j = H_j x + z_j$$

$H_j = (H_{j_1}, \ldots, H_{j_K})$ represents $H_i$ represents the channel matrix ($H_j \in \mathbb{C}^{N_r \times KN_t}$) and $H_{ij}$ represents the channel vector between a user i and an O-RU j ($H_{ji} \in \mathbb{C}^{N_r \times N_t}$).

In the following description of some embodiments of the invention, it is considered that the communication system 100 comprises K user equipments 3, each comprising a $N_t$ antenna, and N O-RUs 5 with $N_r$ receiving antennas ($N_r \gg K$).

Figure 2:
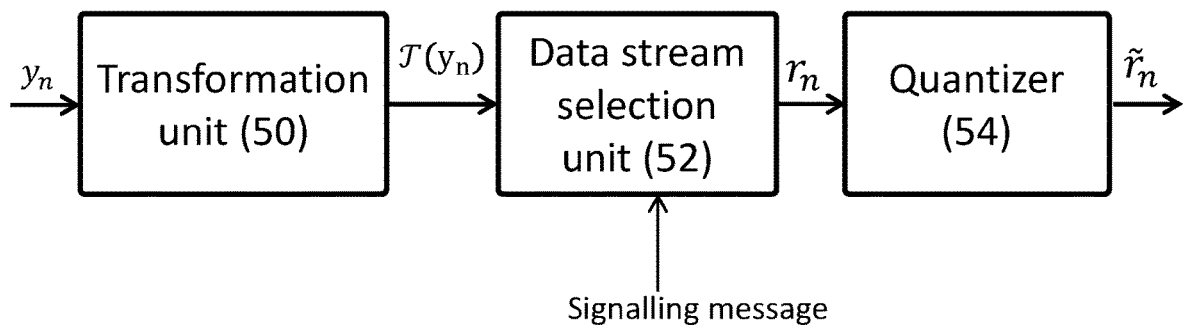
FIG. 2 a diagram depicting the structure of an O-RU according to some embodiments.

FIG. 2 represents the structure of an O-RU 5 according to some embodiments of the invention.

Each O-RU n (5) may comprise a transformation unit 50 configured to apply a transformation operation $\mathcal{T}(y_n)$ to the received signal $y_n$ to transform the received signal vector $y_n$ into a transformed vector to reduce the dimension of the received signal.

In one embodiment, the transformation operation $\mathcal{T}(y_n)$ applied to the received signal vector $y_n$ consists in scaling the received signal vector $y_n$ by the Hermitian transposition $H_n^H$ of the channel matrix $H_n$ (channel matrix from all users to O-RU n), which provides a transformed vector $\mathcal{T}(y_n) = H_n^H y_n$. The superscript $(\bullet)^H$ designates the Hermitian transposition operator.

The dimension of the transformed vector $H_n^H y_n$ is $KN_t$ while the dimension of the received signal vector $y_n$ is $N_r$, where $H_j = (H_{j_1}, \ldots, H_{j_K})$. Therefore, the transform unit 50 transforms the received signal $y_n$ into a transformed vector $H_n^H y_n$ having reduced dimensions.

To facilitate the understanding of the invention, the following description of some embodiments will be made with reference to the transformation operation that transforms the received signal vector $y_n$ into a transformed vector $H_n^H y_n$, although the skilled person will readily understand that other transformation operations may be applied to the received signal vector $y_j$ to provide a transformed vector with reduced dimensions and carrying the received signal vector information.

Each O-RU n may further comprise a data stream selection unit 52 configured to select a number $K_n$ of components of the transformed vector $H_n^H y_n$, in response to a signalling message received from the coordination system 20, using the information comprised in the signalling message.

In one embodiment, the coordination system 20 may be configured to send a signalling message comprising N numbers ($K_1, \ldots K_n, \ldots, K_N$) to the N O-RUs 5, each number $K_n$ comprised in the signalling message designating the number of data streams (each data stream corresponding to a component $h_{ij}^T y_j$ of the transformed vector $H_n^T y_n$) that are to be sent by the n-th O-RU 5 (O-Ru n) to the O-DU 6, such that $\Sigma_{n=1}^{N} K_n \geq KN_t$.

In response to the receipt of the signalling message, an O-RU n may extract the value $K_n$ from the signalling message, the value $K_n$ indicating the number of components that are to be sent by the O-RU n to the O-DU 6. The data stream selection unit 52 of the O-RU n may then use the number $K_n$ to determine $K_n$ data streams to the O-DU 6. The O-DU 6 will thus receive k data streams from all the O-RUs 5 (O-Ru 1, ... O-Ru n, ... O-Ru N) with:

$$\tilde{K} = \Sigma_{n=1}^{N} K_n \geq KN_t \quad (2)$$

In one embodiment, the coordination system 20 may be configured to measure the eigenvalues of the covariance channel matrix at each O-RU 5 or at the O-DU 6. The eigenvalues may be exchanged between the O-RUs 6 and used by the data stream selection unit 52 of each O-RU 5 to determine the data streams to be sent from each O-RU 5 to the O-DU 6.

In some embodiments, the coordination system 20 may be configured to exchange a threshold TH of eigenvalues among the O-RUs 5, using a signalling message, the data stream selection unit 52 of each O-RU 5 further using this threshold to determine which data streams to be sent from each O-RU to an O-DU 6. The data stream selection unit 52 of an O-RU n receiving the signalling message may be configured to select the components of the transformed vector corresponding to eigenvalues of the covariance channel matrix that are higher to the threshold TH.

In some embodiments, the signalling message sent to each O-Ru n may comprise a selection vector $V_n$ of length $N_r$, with $N_r$ representing the number of receiving antennas at the O-RUs. The matrix $diag(V_n)$ represents a diagonal matrix comprising on its main diagonal the elements of the vector $V_n$.

In one embodiment, the i-th component $V_n(i)$ of the vector $V_n$ has a value equal to 1 if the i-th component of the transformed vector has to be sent by the O-RU n to O-DU 6, and otherwise has a value equal to 0 if the i-th component of the transformed vector is not to be sent by the O-RU n to O-DU 6.

As used herein, i-th component of a vector refers to an element of the vector defined by index i. Further, a component of a matrix refers to an element of the matrix defined by a row index and a column index.

In some embodiments, the selection vector $V_n$ may be determined based on the eigenvalues of the covariance channel matrix $H_n^H H_n$.

In one embodiment, the i-th coefficient $V_n(i)$ of the vector $V_n$ has a value equal to 1 if the i-th eigenvalue of the covariance channel matrix is higher or equal to the threshold TH, and otherwise has a value equal to 0 if the i-th eigenvalue of the covariance channel matrix is lower to the threshold TH.

Advantageously, the selection vectors $(V_1, \ldots V_n, \ldots V_N)$ sent to the different O-RUs 5 (such that the O-RU n receives the vector $V_n$) using the signalling message ensure that the n-th O-RU 5 will only send $K_n$ data streams, the numbers $(K_1, \ldots K_n, \ldots, K_N)$ being such that $\Sigma_{n=1}^N K_n \geq KN_t$, with $K_n$ designating the number of data streams that are to be sent from the O-RU n to the O-DU 6.

To ensure that the different O-RUs 5 do not send the same data streams to the O-DU 6, the vectors $(V_1, \ldots V_n, \ldots V_N)$ are determined such that $$\Sigma_{n=1}^N V_n(i) \geq 1 \quad (3)$$

The data stream selection unit 52 of the O-RU n may select the $K_n$ data streams to be sent to the O-DU 6 by performing the matrix multiplication between the matrix $\text{diag}(V_n)$ and the transformed vector $H_n^H y_n$ according to equation (4.1):

$$r_n = \text{diag}(V_n) H_n^H y_n \quad (4.1)$$

In equation (4), $r_n$ designates the vector of selected data stream.

The O-RU n then applies the vector $r_n$ of selected data stream to the quantizer to apply a quantization operation $Q(\cdot)$, which provides a quantized vector $\tilde{r}_n$:

$$\tilde{r}_n = Q(r_n) \quad (4.2)$$

The quantized vector is then sent by the O-RU n to the O-DU 6. The quantized vector thus comprises $K_n$ data streams corresponding to $K_n$ components of the transformed vector.

Figure 3:
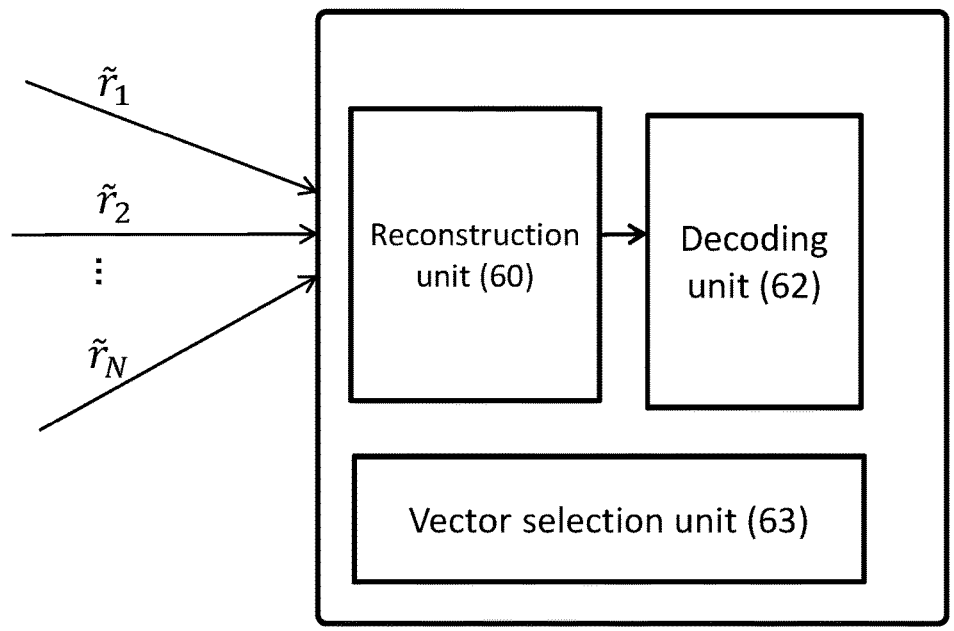
FIG. 3 is a diagram depicting the structure of an O-DU according to some embodiments.

FIG. 3 represents the structure of the O-DU 6 according to some embodiments.

As shown in FIG. 3, the O-DU 6 may comprise a reconstruction unit 60 configured to reconstruct the received signal y from the quantized vectors $(\tilde{r}_1, \ldots, \tilde{r}_n, \ldots \tilde{r}_N)$ received from all the O-RUs 5. In one embodiment, the reconstruction unit 60 of the O-DU 6 may be configured to perform a reconstruction of the received signal vector, based on the quantized vectors $\tilde{r}_1, \ldots, \tilde{r}_n, \ldots \tilde{r}_N$ received from all the O-RUs 5 (O-RU 1, ..., O-RU n, ... O-RU N), which provides a reconstructed vector r.

For example the reconstruction operation may be a summation of the quantized vectors $\tilde{r}_1, \ldots, \tilde{r}_n, \ldots \tilde{r}_N$ according to equation (4.3):

$$\tilde{r} = \Sigma_{i=1}^N \tilde{r}_i \quad (4.3)$$

The O-DU 6 may further comprise a decoder 62 configured to decode the reconstructed vector r to provide an estimate $\hat{x}$ of the received signal. The decoder 62 may be for example a MMSE decoder or a ZFDE decoder.

By sending a reduced number of data streams from each O-RU 5 to the O-DU and concatenating all the data streams received from the different O-RUs 5 in the O-DU 6, the coordination system 20 enables reducing the quantization noise compared to a conventional scheme. Indeed, by enabling selection of the best $N_j (N_j < KN_t)$ entries in the vector $H_n^H y_n$ at O-RU n instead of transmitting the whole vector $H_n^H y_n$, the coordination system 20 makes it possible to mitigate the degradation induced by the quantization performed by the quantizer 54. This also obviates receiving at the O-DU 6, N times number of observations than the number of user messages to be decoded (i.e. the dimension of x).

In one embodiment, the coordination system 20 may be a centralized coordination system. Alternatively, the coordination system 20 may be a distributed coordination system.

In a centralized embodiment, the signalling message may be constructed and sent by the O-DU 6 to each O-RU 5 (O-Ru 1, ..., O-Ru n, ... O-Ru N).

In such centralized embodiment, the signalling message may be related to the Channel State Information (CSI), assuming that the CSIs are perfectly known at O-DU 6.

In a centralized embodiment, the O-DU 6 may determine the selection vectors $(V_1, \ldots V_n, \ldots V_N)$ associated with the respective O-RUs (O-RU 1, ..., O-RU n, ... O-RU N) from information related to the covariance channel matrix (for example the eigenvalues of the covariance channel matrix or the determinant of the covariance channel matrix).

The O-DU 6 may send a signalling message to each O-RU 5, O-RU after O-RU or alternatively send the signalling message to all the O-RUs simultaneously or according to a particular order or an arbitrary order.

The signalling message may depend on the channel state information CSI, which comprises information related to the channel matrix H. In some embodiments, the transmission of a signalling message to the O-RUs 5 may be performed dynamically. In such embodiment, the O-DU 6 may dynamically determine and send the selection vectors $(V_1, \ldots V_n, \ldots V_N)$ to the different O-RU (O-RU 1, ..., O-RU n, ... O-RU N), independently of the receipt of a signal by the O-RUs from a user. In particular, as the determination of $\{V_n\}$ vectors depends on the CSI, the transmission of $\{V_n\}$ vectors may be done in a manner characterized by the constant change in the CSI. Thereby, when an O-RU 5 receives a signal from a user, the O-RU 5 thus has already the knowledge of the selection vector $V_n$ it has to apply to select $K_n$ data streams so that it can perform the selection of the data streams and the quantization of the selected data stream without waiting for the receipt of a signalling message from the O-DU 6.

Accordingly, instead of sending all the $KN_t$ components of the transformed $H_n^H y_n$ from each O-RU n to the O-DU 6, the coordination system 20 uses the diagonal matrix $\text{diag}(V_j)$ to select a subset of $K_n$ components in $H_j^H y_j$ ($K_n$ selected data streams) to be transmitted from each O-RU n (5) to the O-DU 6, in a coordinated manner. The coordination system 20 thereby makes it possible to better exploit the quantization resources and enhance the O-DU (6) reconstruction quality.

In some embodiments, the coordination system 20 may be further configured to determine the vector $V_n$ to be sent to the O-RU n such that the vector of selected data stream $r_n = \text{diag}(V_n) H_n^H y_n$ is sparse in order to better explore the fronthaul link resource. With such sparse structure of the vector $r_n = \text{diag}(V_n) H_n^H y_n$, it is not necessary to quantize the zero entries of the vector $\text{diag}(V_n) H_n^T y_n$, and more accuracy can be anticipated for non-zero entries after quantization. The use of a sparse vector $r_n = \text{diag}(V_n) H_n^H y_n$ thereby enables mitigating the degradation induced by quantization noise.

To maintain the decoding performance, the number of observations received at O-DU 6 from all O-RUs 5 is assumed to be superior or equal to the number of user messages to be decoded.

The coordination system 20 may be configured to define the selection vectors $\{V_n\}$ so as to fulfill the following two constraints:
- A first constraint consisting in either keeping the k-th entry of $H^T y_n$ or eliminating it with zero.
- A second constraint consisting in ensuring the full rank of the matrix $V = \sum_{n=1}^{N} \text{diag}(V_n)$, and thus that the matrix $(\sum_{n=1}^{N} \text{diag}(V_n) H_n^T \text{diag}(V_n))$, is invertible.

In the following description of some embodiments of the invention, an uplink O-RAN architecture is considered with Gaussian input at users and Gaussian quantization at the O-RUs 5. Further, the exemplary case of a communication system 100 comprising two O-RUs (N=2) is considered to facilitate the understanding of the invention, although the skilled person will readily understand that the invention applies to a communication system 100 comprising any number N of O-RUs 5.

As the signals and noise both follow the Gaussian distribution, when O-RU j sends the quantized $H_j^T y_j$ to the O-DU 6, a sum-rate optimization problem that characterizes the achievable rate region can be expressed as (5) and (6):

$$\max_{\Lambda_q} \log \frac{\left|\left(P\begin{bmatrix} H_1^H H_1 H_1^H H_1 & H_1^H H_1 H_2^H H_2 \\ H_2^H H_2 H_1^H H_1 & H_2^H H_2 H_2^H H_2 \end{bmatrix}\right) + \Lambda_q + \sigma^2 \begin{bmatrix} H_1^H H_1 & H_1^H H_2 \\ H_2^H H_1 & H_2^H H_2 \end{bmatrix}\right|}{\left|\left(\Lambda_Q + \sigma^2 \begin{bmatrix} H_1^H H_1 & H_1^H H_2 \\ H_2^H H_1 & H_2^H H_2 \end{bmatrix}\right)\right|} \tag{5}$$

$$\text{s.t. } \log \frac{\left|(PH_j^H H_j H_j^H H_j + \Lambda_{q_j} + \sigma^2 H_j^H H_j)\right|}{|(\Lambda_{q_j})|} \leq C, \forall i \in \{1, 2\} \tag{6}$$

In expressions (5) and (6), $P = \mathbb{E}[x]$ represents the covariance matrix of user messages with a transmit power P, $\Lambda_{q_j}$ represents the quantization variance at the O-RU j (5) and $\Lambda_q$ is defined by:

$$\Lambda_q = \text{diag}(\lambda_{q_1} \Lambda_{q_2})$$

As the global optimum solution of (5) is prohibitive to obtain, the following practical assumptions to evaluate the achievable rate are made:
- when each entry of $H_j$ is i.i.d. (acronym for "Independent and Identically Distributed") and the number of receiving antennas is sufficiently large ($N_r \gg 1$), according to the law of large numbers, it can be checked that each entry of $H_1^T y_j$ follows the same distribution. Consequently, it is assumed that same quantization level is induced to each entry of $H_j^H y_j$, i.e., $\Lambda_{q_j} = \sigma_{q_j}^2 \mathbb{I}_{KN_t}$.
- to simplify the determinant operator, a low resolution regime is considered, that is, the fronthaul link capacity tends to zero ($C \to 0$).

By determining, at each O-RU j (5), a vector of selected data stream $r_j = \text{diag}(V_j) H_j^T y_j$ from the selection vector $V_j$, and quantizing the vector of selected data stream $r_j$ before transmitting it to the O-DU 6, the coordination system 20 enables achieving a better sum-rate than a classical scheme where an O-RU j quantizes $H_j^H y_j$ and forwards it to the O-DU 6.

To compare the performance of the coordinated compression system 20 with the performance of a conventional system where an O-RU j quantizes $H_j^H y_j$, the achievable sum-rate of quantizing $\text{diag}(V_j) H_j^H y_j$ and the achievable sum-rate of quantizing $H_j^H y_j$ can be compared.

To determine the sumrate of sending $H_j^H y_j$, the determinant operator can be approximated according to Equation (7), considering a small value of $\epsilon$:

$$\det(\mathbb{I} + \epsilon A) = 1 = \epsilon Tr(A) + O(\epsilon^2) \tag{7}$$

Therefore, in low resolution regime with small C, the left side of the constraint defined by (6) can be rewritten as Equation (8):

$$\log \frac{\left|(PH_j^H H_j H_j^H H_j + \Lambda_{q_j} + \sigma^2 H_j^H H_j)\right|}{|(\Lambda_{q_j})|} = \tag{8}$$

$$\log\left|\left(\mathbb{I} + \frac{1}{\sigma_{q_j}^2}(PH_j^H H_j H_j^H H_j + \sigma^2 H_j^H H_j)\right)\right| =$$

$$\log\left(1 + \frac{1}{\sigma_{q_j}^2} Tr(PH_j^H H_j H_j^H H_j + \sigma^2 H_j^H H_j) + O\left(\frac{1}{\sigma_{q_j}^4}\right)\right) =$$

$$\frac{1}{\sigma_{q_j}^2} Tr(PH_j^H H_j H_j^H H_j + \sigma^2 H_j^H H_j) + O\left(\frac{1}{\sigma_{q_j}^4}\right)$$

To maximize the sum-rate defined by equation (5), the inequality constraint can be relaxed to an equality constraint, and thus the quantization levels $\sigma_{q_j}^2$ can be approximated by equation (9):

$$\sigma_{q_j}^2 \approx \frac{1}{C} Tr(PH_j^H H_j H_j^H H_j + \sigma^2 H_j^H H_j) \tag{9}$$

By integrating equation (9) into equation (5), the sum-rate can be simplified and rewritten as (10)

$$C \sum_{j=1}^{2} \frac{Tr(PH_j^H H_j H_j^H H_j)}{Tr(PH_j^H H_j H_j^H H_j + \sigma^2 H_j^H H_j)} \tag{10}$$

When transmitting the vector of selected data streams $r_j = \text{diag}(V_j) H_j^H y_j$ instead of $H_j^H y_j$, and by reformulating the optimization problem defined by expressions (5) and (6), with an additional term $V_j$, with $V_j$ being the j-th selection vector comprising either 0 or 1 components, the achievable rate (10) can be derived in a similar way and rewritten as:

$$C \sum_{j=1}^{2} \frac{Tr(\text{diag}(V_j) PH_j^H H_j H_j^H H_j \text{diag}(V_j)^H)}{Tr(\text{diag}(V_j)(PH_j^H H_j H_j^H H_j + \sigma^2 H_j^H H_j \text{diag}(V_j)^H)} \tag{11}$$

Since the matrix $\text{daig}(V_j)$ is a vector with either 0 or 1 components, for any square matrix X with diagonal terms $x_{kk}$ where $k \in \{1, \ldots, KN_t\}$, the trace of $V_j X V_j^H$ can be seen as the sum of a subset of $\{x_{kk}\}$, i.e., $Tr(V_j X V_j^H) = \sum_{k=1}^{KN_t} x_{kk} v_{j,k}$.

Consequently, for any matrix X and Y, inequality (12) is verified $$\exists (V_1, V_2) \in \mathcal{V}, \frac{Tr(\text{diag}(V_j) X \text{diag}(V_j)^H)}{Tr(\text{diag}(V_j) Y \text{diag}(V_j)^H)} \geq \frac{Tr(X)}{Tr(Y)} \tag{12}$$

Therefore, this demonstrates that with a suitable selection of the Vj(k) components, there exists several combinations of $(V_1, V_2) \in \mathcal{V}$ such that the achievable rates of sending $\text{diag}(V_j)H_j^H y_j$ can outperform the rates of sending $H_j^H y_j$, in the example N=2, in asymptotic regime with small fronthaul link capacity.

Accordingly, sending fewer data streams at each O-RU is favourable to the achievable rate in the low resolution regime.

In some embodiments, the coordination system 20 may comprise a selection vector determination unit 63 configured to appropriately select the selection vectors $\{V_n\}$, in order to enhance the decoding performance at the O-DU 6.

Figure 4:
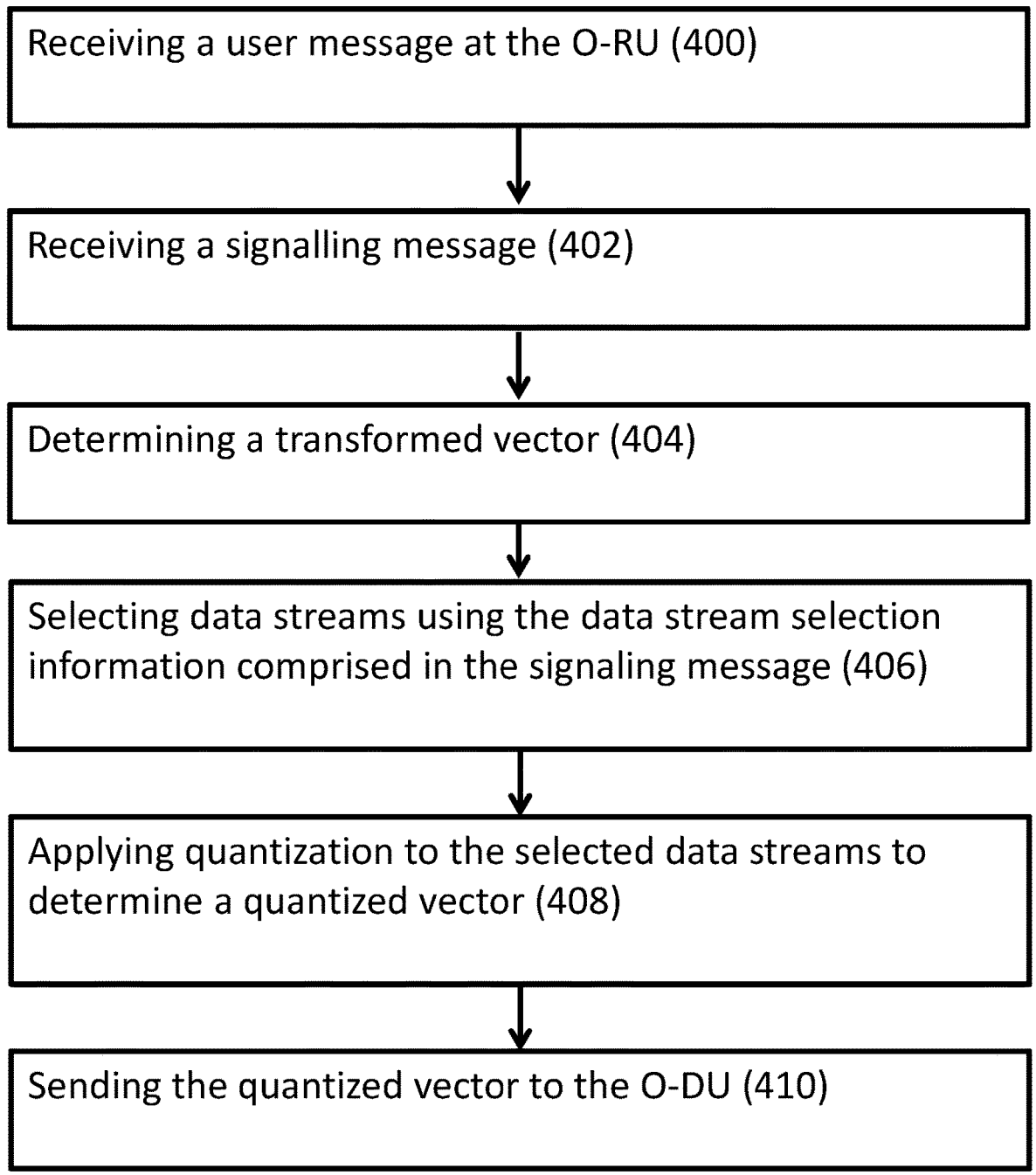
FIG. 4 is a flowchart depicting a method of transmitting data streams from an O-RU to the O-DU.

In the embodiments where the coordination system 20 is centralized, the selection vector determination unit 63 may be included in the O-DU 6, as shown in FIG. 4.

To facilitate the understanding of some embodiments of the invention, the description of the determination of the selection vectors $\{V_j\}$ will be made with reference to an exemplary implementation of the communication system 100 comprising two O-RU 5 although the skilled person will readily understand that the invention more generally apply to any number of O-RUs.

Depending on the information required at the O-RUs, the selection vector determination unit 63 may determine the selection vectors $\{V_j\}$ according to two determination schemes:

In a first determination scheme, the set of selection vectors $\{V_j\}$ only depends on statistical information of the channel matrix H, In a second determination scheme, the set of selection vectors $\{V_j\}$ only depends on instantaneous realizations of the channel matrix H.

According to the first determination scheme, the set of selection vectors $\{V_j\}$ may be fixed and not relevant to the instantaneous channel information.

In such case, although the exchange of channel information is not required, the number $K_j$ of data streams to be sent from each O-RU j (5) to the O-DU 6 may be predefined, and the non-zero entries of the set of selection vectors $V=\{V_j\}$ may be predetermined. In one embodiment, the observation having the strongest average power over all channel realizations may be selected. For instance, if the $k^{th}$ and $m^{th}$ entries of $\mathbb{E}_H[H_j^H y_j]$ have the strongest average power over all channel realizations, each selection vector $V_j$ may be set defined such that the component $V_j(k)=1$ and the component $V_j(m)=1$ to enable keeping the two strongest entries can be kept.

It should be noted that when each entry of H is i.i.d. (Independent and identically distributed), each entry of $\mathbb{E}_H[H_j^H y_j]$ has the same power. In this case, the choice of the elements to be equal to one is done randomly. k may be selected randomly such that $V_j(k)=1$ (since all entries have the same power).

According to the second determination scheme, the set of selection vectors $V=\{V_j\}$ depend on instantaneous channel information. The non-zero entries of $\text{diag}(V)H_j^H y_j$ correspond to the data streams (observations) that are to be quantized and forwarded to the O-DU 6. In one embodiment of the second determination scheme, the set of selection vectors $V=\{V_j\}$ may be determined based on the channel matrix H.

In particular, the set of selection vectors $V=\{V_j\}$ may be determined based on the RSNR priority or RSNRP (RSNRP is the acronym for "Received Signal-to-noise Ratio Priority"). In such embodiment, considering the notation $H_1=[h_{1,1}, \ldots, h_{1,KN_t}]$, the second determination scheme implemented by the vector determination unit 63 may consist in selecting the best $K_1$ channel vectors among the $KN_t$ channel vectors at the first O-RU 5 to maximize the received signal-to-noise ratio (SNR), as expressed by (13):

$$\underset{k}{\text{argmax}} \frac{\|h_{1,k}^H H_1\|_2^2}{\|h_{1,k}^H\|_2^2} \quad (13)$$

By defining the index of the $K_1$ channel vectors which have the best received SNR as $\{i_1, \ldots, i_{K_1}\}$, the elements of the first selection vector $V_1$ may be determined by the vector determination unit 63 as $V_1(k)=1$ if $k \in \{i_1, \ldots, i_{K_1}\}$ and $V_1(k')=0$ if $k' \notin \{i_1, \ldots, i_{K_1}\}$. The second selection vector $V_2$ may be determined such that: $\text{diag}(V_1)+\text{diag}(V_2)=\mathbb{I}$.

Therefore, the components of second selection vector $V_2$ are such that $V_2(k)=1$ when $k \in \{i_1, \ldots, i_{K_1}\}$ and $V_2(k')=0$ when $k' \notin \{i_1, \ldots, i_{K_1}\}$. According to the RSNRP approach, the priority indexes $i_1, \ldots, i_{K_1}$ may be exchanged between the O-RUs 5 such that the two O-RUs 5 can send selected data stream in a coordinated way. In one embodiment, the exchange of the priority indexes $i_1, \ldots, i_{K_1}$ may be performed between the O-RUs 5 using an auxiliary signalling message between O-RUs 5.

More generally, if the communication system 100 comprises N O-RUs, the vectors $\{V_n\}$ may be determined by selecting the best $K_n$ data streams that maximize the received SNR (Signal To Noise Ratio) as expressed by (13). Further, the following constraint is to be satisfied: For all k-th data streams, the sum over n=1 to N of $V_n(k)$ is greater or equal to 1.

Alternatively, the set of selection vectors $V=\{V_j\}$ may be determined, according to the second determination scheme, based on the Condition number priority (CNP).

Assuming that the O-DU 6 has the perfect knowledge of H, the vector determination unit 63 may be configured to select a combination of $V_1$ and $V_2$ in a way that maximizes the fraction between:

(i) the determinant of the matrix $\Sigma_{j=1}^2 \text{diag}(V_j)H_j^H H$, and (ii) the conditional number of the matrix $\Sigma_{j=1}^2 \text{diag}(V_j) H_j^H H$ defined by $$\frac{\lambda_{max}(\text{diag}(V_1)H_1^H H + \text{diag}(V_2)H_2^H H)}{\lambda_{min}(\text{diag}(V_1)H_1^H H + \text{diag}(V_2)H_2^H H)}.$$

$\lambda_{min}$ designates the minimum eigenvalue, and $\lambda_{max}$ designates the maximum eigenvalue.

The conditional number CNP of the matrix $\Sigma_{j=1}^2 \text{diag}(V_j) H_j^H H$ defined by $$\frac{\lambda_{max}(\text{diag}(V_1)H_1^H H + \text{diag}(V_2)H_2^H H)}{\lambda_{min}(\text{diag}(V_1)H_1^H H + \text{diag}(V_2)H_2^H H)}$$

is given by expression (14):

$$\underset{V_1, V_2 \in \mathcal{V}}{\max} \frac{|\text{diag}(V_1)H_1^H H + \text{diag}(V_2)H_2^H H|}{\text{Cond}(\text{diag}(V_1)H_1^H H + \text{diag}(V_2)H_2^H H)} \quad (14)$$

A significant gain might be achieved by a selection of the data streams to be sent by each O-RU that ensures a well-conditioned matrix at the O-DU 6. Considering the degradation brought by quantization noise, fewer data streams are to be sent by each O-RU, especially in low resolution regime. Therefore, the total number of data streams sent by all O-RUs 5 to the O-DU 6 may be set to be equal to the number of user messages to be decoded, such that the selection vectors $V_1$ and $V_2$ satisfy $V_1+V_2=\mathbb{I}_{KN_t}$.

Consequently, the CNP can be rewritten according to expression (15):

$$\max_{V_1+V_2=\mathbb{I}_{KN_t}} \frac{|\text{diag}(V_1)H_1^H H_1 + \text{diag}(V_2)H_2^H H_2|}{\text{Cond}(\text{diag}(V_1)H_1^H H_1 + \text{diag}(V_2)H_2^H H_2)} \quad (15)$$

In such embodiment based on the CNP, the O-DU 6, which has the perfect knowledge of all channel information, may determine the selection vectors $\{V_n\}$ and send each selection vector $V_n$ to the corresponding O-RU n using the signalling message. For example, in the case of N=2, Knowing all the channels, the O-DU 6 may determine the vectors $V_1$, $V_2$ jointly and send $V_1$ to the first O-RU 5 and $V_2$ to the second O-RU 5.

More generally, for a communication 100 comprising any number N of O-RUs, the selection vectors $V_n$ (for $1 \leq n \leq N$) may be determined by maximizing the fraction between the determinant of $\Sigma_{j=1}^{N} \text{diag}(V_j)H_j H_j^H$ and its condition number.

Depending on the vector determination scheme used by the vector determination unit 63, the implementation may involve different features. For example, the first determination scheme can be implemented by the vector determination unit 63 offline, without requiring additional signalling, as the vectors $V_j$ only depend on the channel statistical information in such embodiment. In contrast, the second determination scheme may be implemented by the vector determination unit 63 online by exchanging the instantaneous channel information. Further, the second determination scheme related to RSNRP may be less difficult to implement in comparison with the second determination scheme related to CNP since the information that is needed to be exchanged for this scheme may be exchanged in a distributed way among O-RUs 5, unlike the CNP scheme which needs a centralized entity (the O-DU) to jointly determine the $V_j$ and send them to each O-RU 5.

The performance of the coordination system 20 according to the embodiments of the invention has been compared with a conventional approach where the $H_j^H y_j$ are quantized and forwarded to the O-DU 6.

To assess the decoding performance, the symbol error rate (SER) of different techniques have been compared, considering the example of a communication system 100 consisting of four single antenna users and two O-RUs 5 equipped with ten receiving antennas. In the considered example, element-wise uniform quantization is used at each O-RU 5. The fronthaul link capacity can be represented by R, which denotes the number of overall quantization bits per O-RU 5. In the considered example, the overall quantization bits per O-RU is assumed to be uniformly allocated to all non-zero entries. The user message is assumed to follow the 16QAM constellation. All the channels are assumed to be independent, identically distributed (i.i.d.) and to follow a normal distribution $\mathcal{CN}(0,1)$.

Further, in the considered example, the decoder 62 used at the O-DU 6 is a ZF decoder which is configured to multiply the (pseudo) inverse matrix to reconstruct the user messages. The signal received from an O-RU j at the O-DU 6 is denoted $s_j^{(i)}$ with $i \in \{\text{Con,Nov}\}$, where Con designates the conventional approach consisting in sending all the components of $H_j^H y_j$ to the O-DU and Nov represents the coordination system 20 according to the embodiments of the invention configured to send $\text{diag}(V_j)H_j^H y_j$ to the O-DU 6.

The ZF decoder (60) can be expressed by equation (16) for the conventional system Con and by equation (17), in embodiments of the invention:

$$x^{ZF,con} = (H^H H)^{-1}(s_1^{(Con)} + s_2^{(Con)}) \quad (16)$$

$$x^{ZF,Nov} = (\text{diag}(V_1)H_1^H H_1 + \text{diag}(V_2)H_2^H H_2)^{-1} (s_1^{(Nov)} + s_2^{(Nov)}) \quad (17)$$

The embodiments of the invention therefore provide a coordination system 20 that enables performing a distributed compression at the O-RUs such that the O-DU can better jointly decode the user messages.

The coordination system 20 enables sending the useful information as much as possible from O-RUs to the O-DU 6.

Advantageously, the compression system 100 uses a signalling message to transmit information on the different channels, sent or exchanged between the O-RUs to exploit the correlations between the signals received at the different O-RUs 5. Such signalling message forms a coordination key that enables all the O-RUs to compress the received signals in a cooperative manner, thereby enhancing the performance of the coordinated compression scheme between the multiple O-RUs and enhancing the joint decoding performance at the Open Distributed unit O-DU 6.

The coordination system 20 enables determining which data streams to be sent by each O-RU and how to combine/concatenate all these data streams received at the O-DU 6 to better decode the user messages.

This prevents from large degradation on messages reconstruction at O-DU 6 that might occur in the prior art, due to quantization, especially in Massive MIMO scenario.

The embodiments of the invention enable transforming the signal received at each O-RU into a smaller size vector, and transmission of these vectors to the O-DU 6 in a coordinated way to mitigate the noise induced by quantization, while ensuring the decoding performance at O-DU 6.

The coordination system 20 implements coordination between the O-RUs either by information exchange among the O-RUs (distributed approach), or by feeding back the information from the O-DU 6 to O-RUs (centralized approach) using a signalling message. With the signalling message, each O-RU can determine how many data streams need to be sent to the O-DU 6 and which data streams need to be sent to the O-DU 6, in a cooperative manner such that the O-DU can achieve better decoding performance in the presence of quantization noise.

Advantageously, the structure of the signalling message incorporating the data stream selection information is simple, thereby resulting in a low overhead.

FIG. 4 is a flowchart depicting the coordination method performed at an O-RU j to transmit selected data streams to the O-DU 6.

In step 400, a user message is received by the O-RUs 5, the message received at each radio unit (5) being represented by a signal vector.

In step 402, a signalling message is received at the O-RU j comprising data stream selection information.

In step 404, a transformation operation is applied to the signal vector received by the O-RU j 5, which provides a transformed vector, the transformation being defined to reduce the dimension of the received signal vector; In step 406, a number of data streams corresponding to components of the transformed vector are selected using the data stream selection information (selection vector $V_n$ for example) comprised in the signalling message.

In step 408, a quantization operation is applied to the selected data streams, which provides quantized vectors, In step 410, the quantized vectors are sent from the O-RU j to the distributed unit (6).

Figure 5:
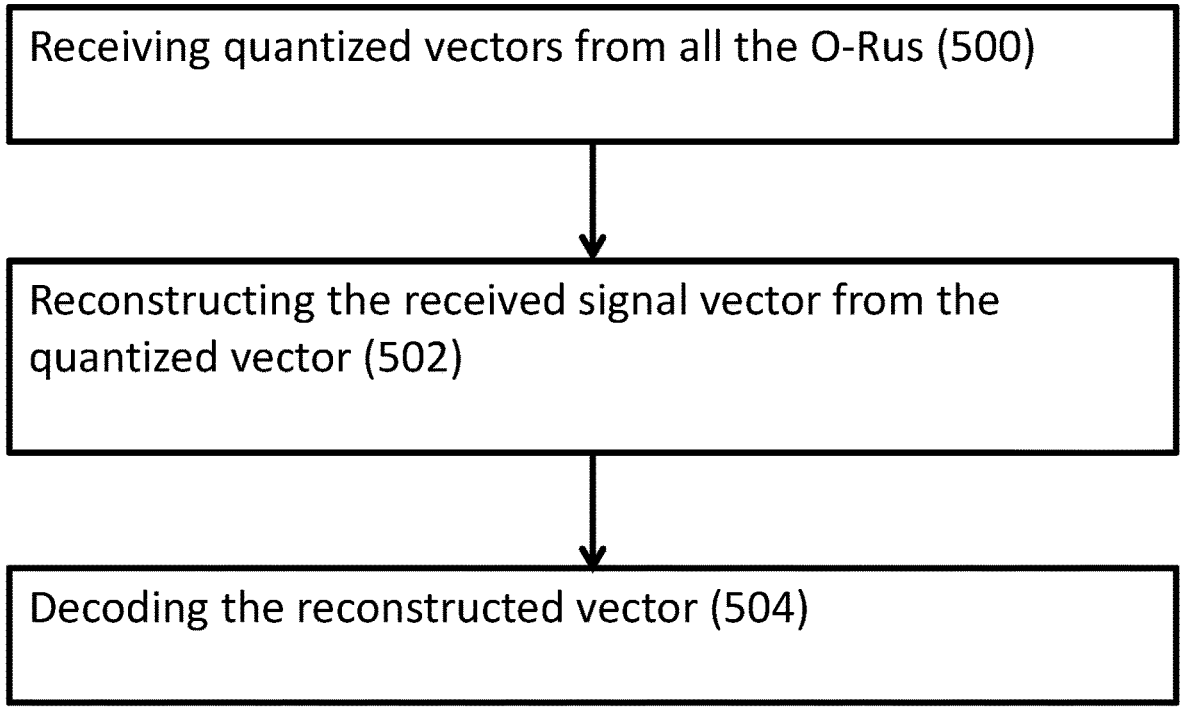
FIG. 5 is a flowchart depicting a method of processing the data streams received form all the O-RUs by the O-DU.

FIG. 5 is a flowchart depicting the processing performed at the O-DU 6 to decode the received signal vector.

In step 500, the quantized vectors from all the O-RU 6 are received by the O-DU 6. The O-DU 6 thereby receives $K_n$ data streams from each O-RU n.

In step 502, a summation of all the quantized vectors received at the O-DU 6 is performed to reconstruct the received signal.

In step 504, the reconstructed signal is decoded to determine an estimate of the signal transmitted by the user.

In a centralized approach, the coordination method may further comprise determining at the O-DU 6, the data stream selection information to be sent to all O-RU (selection vectors $\{V_n\}$ for example) and sending a signalling message encompassing the data stream selection information.

Figure 6:
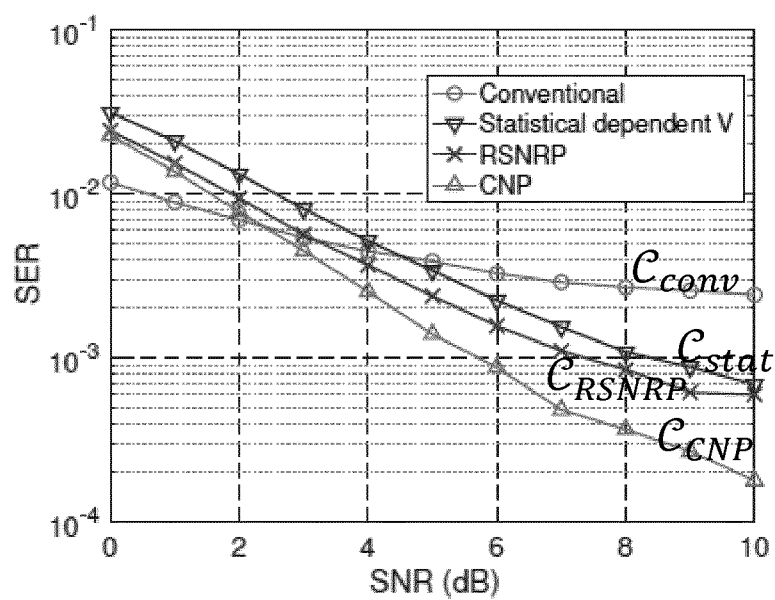
FIG. 6 is a diagram depicting the Symbol Error Rate (SER) as a function of the Signal-To-Noise Ratio (SNR) obtained using different embodiments of the invention in comparison with a conventional approach.

FIG. 6 is a diagram depicting the Symbol Error Rate (SER) as a function of the Signal-To-Noise Ratio (SNR) using different embodiments of the invention, in comparison with a conventional approach. The SNR defined by $$\frac{P}{\sigma^2}.$$

In the diagram of FIG. 6:

The curve $C_{stat}$ represents the SER obtained using an exemplary implementation in which the selection vectors $\{V_n\}$ are determined using the first determination scheme;

The curve $C_{RSNRP}$ represents the SER obtained using an exemplary implementation in which the selection vectors $\{V_n\}$ are determined using the RSNRP determination scheme;

The curve $C_{CNP}$ represents the SER obtained using an exemplary implementation in which the selection vectors $\{V_n\}$ are determined using the CNP determination scheme;

The curve $C_{conv}$ represents the SER obtained using a conventional approach consisting in sending all the components $H_j^H y_j$ of the transformed vector rom each O-RU to the O-DU 6.

As shown in FIG. 6, the conventional approach represented by curve $C_{conv}$ to send $H_j^H y_j$ has less reconstruction error when SNR is relatively low since sending more information can be beneficial when the dominant noise is the additive noise received at O-RU 5 but not the quantization noise. More importantly, when SNR is higher than 3 dB, it can be observed that all the vector determination schemes outperform the conventional scheme.

FIG. 6 also shows that the different techniques represented by the curves $C_{stat}$, $C_{RSNRP}$, and $C_{CNP}$ to determine the selection vectors $V_n$ provide a lower SER when more information is required at O-RUs 5.

Therefore, the embodiments of the invention are more efficient at reconstructing the user messages, when the channel noise received at O-RUs 5 does not dominate the quantization noise.

Figure 7:
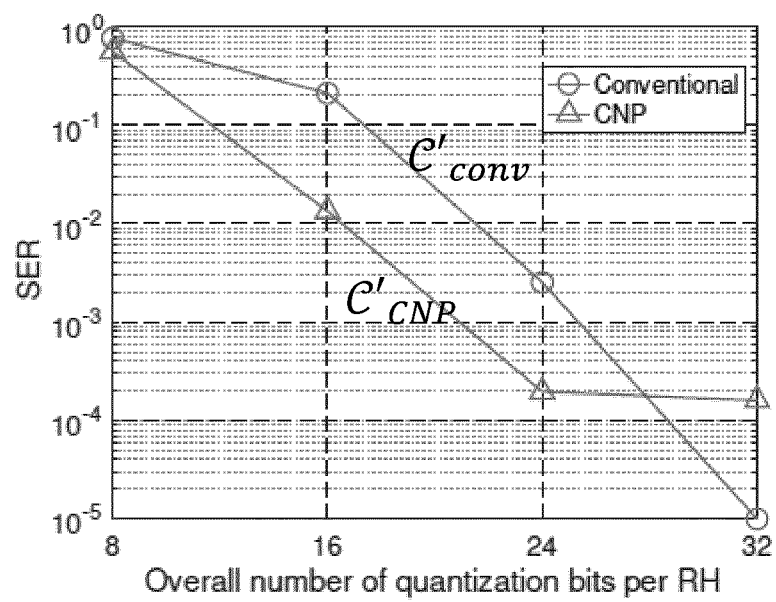
FIG. 7 is a diagram depicting the Symbol Error Rate (SER) as a function of the overall number of quantization bits per O-RU obtained with a CNP embodiment of the invention in comparison with a conventional approach.

FIG. 7 is a diagram depicting the Symbol Error Rate (SER) as a function of the overall number of quantization bits per O-RU according to a CNP embodiment of the invention in comparison with a conventional approach.

FIG. 7 depicts the impact of fronthaul link capacity and provides a comparison of SER with different number of quantization.

In the diagram of FIG. 7:

The curve $C'_{CNP}$ represents the SER obtained using an exemplary implementation in which the selection vectors $\{V_n\}$ are determined using the CNP determination scheme;

The curve $C'_{conv}$ represents the SER obtained using a conventional approach consisting in sending all the components $H_j^H y_j$ of the transformed vector rom each O-RU to the O-DU 6.

In FIG. 7, the gains brought by the vector determination schemes are illustrated as a function of the overall number of quantization bits per O-RU 5, that is, the fronthaul capacity. In low and moderate resolution regimes, the CNP determination scheme can reduce the SER up to ten times since the quantization noise substantially impacts on the decoding performance. Nevertheless, when the number of quantization bits is sufficiently large (e.g., 32 bits), the quantization noise can be negligible. Although the conventional approach can achieve lower SER, the coordination system 20 can bring large improvement when the quantization noise is not negligible.

The coordination system 20 according to the embodiments of the invention thereby enables enhancing the SER performance in cloud RAN systems. They enable improving efficiency with respect to conventional scheme approaches in an asymptotical regime where the fronthaul capacity is assumed to be very small. Further, significant gain is obtained with the use of the selection vectors in low and moderate resolution regimes.

It should be noted that although the description of some embodiments of the invention has been made with reference to a centralized coordination system 20 where the signalling message and the data stream selection information are determined and sent from the O-DU 6, the invention also applies to a distributed coordination system 20.

In such distributed embodiment of the invention, instead of receiving the signalling message the from O-DU 6, each O-RU 5 may exchange the eigenvalues of the covariance channel matrix, or more generally data stream selection information, with other O-RUs 5.

Embodiments of the present invention can take the form of an embodiment containing software only, hardware only or both hardware and software elements.

For example, the methods described herein, the O-RU 5 and/or the O-DU 6 according to embodiments of the invention, can be implemented according to a hardware and/or software implementation.

Furthermore, the methods described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions specified herein.

It should be noted that the functions, acts, and/or operations specified in the flow charts, sequence diagrams, and/or block diagrams may be re-ordered (for example step 402 of FIG. 4 may be performed before step 400 or after stem 404), processed serially, and/or processed concurrently consistent with embodiments of the invention. Moreover, any of the flow charts, sequence diagrams, and/or block diagrams may include more or fewer blocks than those illustrated consistent with embodiments of the invention.

While embodiments of the invention have been illustrated by a description of various examples, and while these embodiments have been described in considerable detail, it is not the intent of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described.

The invention claimed is:

1. A communication system having an open radio access network architecture, said communication system comprising a number (K) of user equipments configured to exchange messages through the communication system, a user equipment comprising a number of transmit antennas, the communication system comprising one or more radio unit and a distributed unit, each radio unit being connected to the distributed unit through a fronthaul link having a given capacity, wherein the communication system comprises a coordination system, the coordination system being configured to coordinate the exchanges between the radio units of the system and the distributed unit, in response to a message being received by the radio units from a user equipment, the message received at each radio unit being represented by a signal vector, wherein the coordination system is configured to send a signalling message to each radio unit comprising data stream selection information, wherein each radio unit comprises:
   a transformation unit configured to apply a transformation operation to the signal vector received by said radio unit, which provides a transformed vector, said transformation operation being defined to reduce the dimension of the received signal vector;
   a data stream selection unit configured to select a number of data streams corresponding to components of the transformed vector using the data stream selection information comprised in the signalling message,
   a quantizer configured to apply a quantization operation to the selected data streams, which provides quantized vectors,
the radio unit being configured to send the quantized vectors to the distributed unit,
wherein the sum, over all the radio units connected to the distribution unit, of the numbers of data streams selected at each radio unit is higher or equal to the product of the number of user equipments (K) and the number of antennas of a user equipment.

2. The communication system of claim 1, wherein the distributed unit comprises a reconstruction unit configured to perform a reconstruction of the received signal vector based on the quantized vectors received from all the radio units, which provides a reconstructed signal vector, and a decoder configured to decode the reconstructed signal vector to determine an estimate of the signal transmitted by the user equipment.

3. The communication system of claim 1, wherein the data stream selection information received through a signalling message by a given radio unit comprises a selection vector ($V_j$), associated with said given radio unit, said selection vector having a length ($N_r$) corresponding to the number of receiving antennas comprised in each radio unit, wherein the data selection unit of said given radio unit is configured to extract the selection vector corresponding to said given radio unit from said signalling message, and perform a matrix multiplication between a diagonal matrix comprising a diagonal formed by the components of the selection vector $V_n$ and the transformed vector, which provides a vector of selected data streams, the quantizer of the given radio-unit being applied to vector of selected data streams.

4. The communication system of claim 3, wherein the selection vector associated with each radio unit is determined from the Channel State Information.

5. The communication system of claim 4, wherein the i-th coefficient $V_n(i)$ of the selection vector $V_n$ associated with the given radio unit has a value equal to 1 if the i-th component of the transformed vector has to be sent from said given radio unit to the distributed unit, and otherwise has a value equal to 0 if the i-th component of the transformed vector is not to be sent from said given radio unit to the distributed unit.

6. The communication system of claim 3, wherein each selection vector ($V_n$) is determined based on the eigenvalues of a covariance channel matrix.

7. The communication system of claim 3, wherein the set of selection vectors ($V_1, \ldots V_n, \ldots V_N$) associated with all the radio units are determined such that:

$$\sum_{n=1}^{N} V_n(i) \geq 1,$$

with N designating the number of radio units.

8. The communication system of claim 3, wherein selection vectors are determined by the distributed unit.

9. The communication system of claim 3, wherein the selection vectors associated with the radio units only depends on statistical information of a channel matrix.

10. The communication system of claim 9, wherein if the $k^{th}$ and $m^{th}$ entries of the covariance matrix of the transformed vector ($\mathbb{E}_H[H_j^H y_j]$) have the strongest average power over all channel realizations, each selection vector ($V_j$) is defined such that the component $V_j(k)$ of the selection vector is equal to the value one and the component $V_j(m)$ of the selection vector is equal to the value one.

11. The communication system of claim 10, wherein the selection vectors associated with the radio units are determined based on a condition number priority of the channel matrix.

12. The communication system of claim 3, wherein the selection vectors associated with the radio units only depends on instantaneous realizations of a channel matrix.

13. The communication system of claim 12, wherein the selection vectors associated with the radio units are determined based on a Received Signal-to-noise Ratio priority.

14. The communication system of claim 13, wherein the coordination system is configured to send auxiliary signalling messages between the radio units to exchange priority indexes.

15. A coordination method implemented in a communication system having an open radio access network architecture, the communication system comprising a number (K) of user equipments exchanging messages through the communication system, a user equipment comprising a number of antennas, the communication system comprising one or more radio unit and a distributed unit, each radio unit being connected to the distributed unit through a fronthaul link having a given capacity, wherein the coordination method comprises coordinating the exchanges between the radio units of the system and the distributed unit, in response to the receipt of a message by the radio units transmitted from a user equipment, the message received at each radio unit being represented by a signal vector, wherein the method comprises sending a signalling message to each radio unit comprising data stream selection information, wherein the method further comprises, at each radio unit:

- applying a transformation operation to the signal vector received by said radio unit, which provides a transformed vector, said transformation being defined to reduce the dimension of the received signal vector;
- selecting a number of data streams corresponding to components of the transformed vector using the data stream selection information comprised in the signalling message,
- applying a quantization operation to the selected data streams, which provides quantized vectors, the method comprising sending the quantized vectors from the radio unit to the distributed unit, wherein the sum, over all the radio units connected to the distribution unit, of the numbers of data streams selected at each radio unit is higher or equal to product of the number of user equipments (K) and the number of antennas of a user equipment.

* * * * *